United States Patent
Walker (10) Patent No.: US 8,694,345 B2
(45) Date of Patent: Apr. 8, 2014

(54) SYSTEM AND METHOD FOR NEGOTIATING A SHARED FLIGHT ITINERARY

(75) Inventor: Jamie Walker, Omaha, NE (US)

(73) Assignee: Cogojets, LLC, Omaha, NE (US)

( * ) Notice: Subject to any disclaimer, the term of this patent is extended or adjusted under 35 U.S.C. 154(b) by 380 days.

(21) Appl. No.: 12/579,823

(22) Filed: Oct. 15, 2009

(65) Prior Publication Data

US 2011/0093301 A1 Apr. 21, 2011

Related U.S. Application Data

(60) Provisional application No. 61/105,658, filed on Oct. 15, 2008.

(51) Int. Cl.
*G06Q 99/00* (2006.01)
(52) U.S. Cl.
USPC .................................. 705/5; 705/6
(58) Field of Classification Search
USPC .......................................................... 705/5, 6
See application file for complete search history.

(56) References Cited

U.S. PATENT DOCUMENTS

| | | | |
|---|---|---|---|
| 7,080,019 B1 | 7/2006 | Hurzeler | |
| 8,180,698 B2* | 5/2012 | Lerner | 705/37 |
| 2004/0267580 A1 | 12/2004 | Becker | |
| 2006/0020496 A1* | 1/2006 | Azzarello et al. | 705/5 |
| 2009/0119135 A1* | 5/2009 | Schoeman et al. | 705/5 |
| 2010/0076795 A1* | 3/2010 | Steir et al. | 705/5 |
| 2010/0262441 A1* | 10/2010 | Walker et al. | 705/5 |

* cited by examiner

*Primary Examiner* — Akiba Allen
(74) *Attorney, Agent, or Firm* — Eugene M. Cummings, P.C.

(57) ABSTRACT

A system and method whereby an air charter brokerage service enables users with similar or matching travel plans to find each other to directly negotiate a shared flight itinerary using a web-based negotiation software application. The air charter brokerage service further enables users to directly book the shared itinerary using a web-based negotiation software application, whereby the air charter brokerage service provides a charter aircraft for the shared flight itinerary.

16 Claims, 10 Drawing Sheets

*Fig. 1*

ABC JETS

Member Home | Cost Calculator | My Profile | FAQ | Contact

Welcome | Member A (logout)

Search Open Flight Proposals — advanced search
From City: Omaha  To City: New York City  GO
To view ALL flight proposals, from or to a city, leave other field blank and search. Leave both fields blank to view the entire database.

Book a Flight
Have enough passengers to book your own flight? GO

Propose A Flight
Need more passengers to book your flight? GO

Cost Calculator
From (city or airport): OMA Omaha NE
To (city or airport): LGA New York NY
Aircraft Size: Light   # of Passengers: Full   ● One Way ○ Round Trip
GET QUOTE

My Flight Proposals
Open | Closed

| Proposal # | From | To | Date | Time |
|---|---|---|---|---|
| 3241 | Omaha, NE (OMA) | New York, NY (LGA) | 11/30/09 | |

My Flight Invites
Open | Booked | Expired | Failed

| Invite # | From | To | Date | Time |
|---|---|---|---|---|
| 1330 | Omaha, NE (OMA) | New York, NY (LGA) | 11/30/09 | 9:00 AM |

```
                                   200
                                      ┐
        ABC           Member    Cost    My Profile      FAQ    Contact
        J E T S       Home      Calculator         201

My Initial Flight Proposal              Member B (logout)

FLIGHT TERMS                            203
        202   From City/Airport          To City/Airport
              [OMA | Omaha NE]           [LGA | New York NY]

204   Departure Date  Range (if one)  Departure Time:
              [11/30/2009]    [11/29/2009]    [Morning  ▽]  ─ 205
        206                              215   Morning
              ⦿ One Way  ○ Round Trip          Noon
        207                                    Evening
              Aircraft Size(max seats): ⦿ Light(6) ○ Midsize (6) ○ Heavy (6)
              Your number of passengers (including you): [2]
        208                                                         217
              Seats available to share: [4]
        209                                              ( GET QUOTE ⇒ )

Preferences
              The details below are required but are not included in the negotiation process
        210   Lead Passenger: [Member B ▽]
        211   Type of Travel: ○ Business ⦿ Personal
        212   Children:       ○ Yes  ⦿ No, but welcome  ○ No
        213   Pets:           ○ Yes  ⦿ No, but welcome  ○ No
              Close negotiation date (when you need to have the negotiaion finished):
        214   [11/27/2009]
              This negotiation date must be completed 24 hours in advance of your flight or will be closed automatically 216   ( SUBMIT  ⇒ )
```

*Fig. 2B*

```
                                                                 220
        Below is your estimated cost assuming a full flight
  221   Total Est Cost:     $13,663.25
  222   Your Est Cost:      $4,554.45                  Fig. 2C
        Flight Time:        2:42
        You may proceed to create this negotiation by
        filling out the remaining required information
        below, then clicking "Create".
```

Fig. 3A

ABC JETS

Member Home | Cost Calculator | My Profile | FAQ | Contact

Your Destination — Member A (logout)

Please leave fields blank to search all open negotiations

- From City: Omaha
- To City: New York City
- advanced search ☑ [SEARCH]
- Depart Date Between: 11/30/2009
- And: 11/29/2009
- Children on Board: No, but welcome
- Pets on Board: No, but welcome
- Type of Travel: Personal
- Find negotiations within [60] miles Destination Search Results (0):

| From | To | Date | Time | Negotiate |
|------|----|----|------|-----------|

No proposed flights found. Propose your own flight.

Reverse Destination Search Results (0):

| From | To | Date | Time | Negotiate |
|------|----|----|------|-----------|

No proposed flights found. Propose your own flight.

Can't find a flight? Propose your own.

Destination Search Results (1):

| From | To | Date | Time | Negotiate |
|------|----|------|------|-----------|
| Omaha, NE (OMA) | New York, NY (LGA) | 11/30/09 | Morning | enter |

ABC JETS

Member Home | Cost Calculator | My Profile | FAQ | Contact

My Initial Flight Proposal — Member A (logout)

Flight Terms

From City/Airport: OMA | Omaha NE
To City/Airport: LGA | New York NY
Departure Date: 11/30/2009   Original flight date: 11/30/2009
Departure Time: 9 : 00 AM
Trip Type: One Way
Aircraft Size (max seats): Midsize (max seats: 6)
Your number of passengers (including you): 2
seats available to share: ☐

(GET QUOTE →)

Preferences
The details below are required but are not included in the negotiation process
Lead passenger: Member A
Type of Travel: ○ Business ● Personal
Children: ○ Yes ● No, but welcome ○ No
Pets: ○ Yes ● No, but welcome ○ No
Close negotiation date (when you need to have the negotiation finished):
11/29/2009
This negotiation must be completed 24 hour in advance of your flight or will be closed automatically.

(SUBMIT →)

Below is your estimated cost assuming a full flight
- Total Est Cost: $18,742.72
- Your Est Cost: $6,247.58
- Flight Time: 2:42

You may proceed to create this negotiation by filling out the remaining required information below, then clicking "Create".

ABC
J E T S

Member Home | Cost Calculator | My Profile | FAQ | Contact
443

Flight Proposal #3241
Negotiation Closes 5 dys. 13 hrs. 22 mins.

Member A (logout)

My Est. Cost: $6,247,58 (full flight)
Total Est. Cost: $18,742,72 (full flight)

From City/Airport
OMA | Omaha NE

Date Range
11/30/2009

My Total Seats [2]
My Total Seats + Seats To Share cannot exceed 6.

My Terms ☺☺☺
Aircraft Type/Max Passengers: Midsize/6

To City/Airport
LGA | New York NY

Time
9  00  AM

Seats to Share [4]  451

My Matches

No flights currently match 100%. You may book at any time to fly alone.

(FLY BY MYSELF →)

452

(UPDATE TERMS →) (DROP OUT →)

*Fig. 4E*

453
[All Members][Member Activity][Matching Members]
Group 1
Member B ☺☺☺
From:          To:              Date Range:  Time:     Seats:
Omaha, NE(OMA) New York, NY(LGA) 11/30/09    11:00 AM  2
Group 2
Member A ☺☺☺
From:          To:              Date Range:  Time:     Seats:
Omaha, NE(OMA) New York, NY(LGA) 11/30/09    9:00 AM   2

*Fig. 4F*

[All Members][Member Activity][Matching Members] 454a    455a
Member B ☺☺☺                              75% Match
From:          To:              Date Range:  Time:     Seats:
Omaha, NE(OMA) New York, NY(LGA) 11/30/09    11:00 AM  2

*Fig. 4G*

456
[All Members][Member Activity][Matching Members]   *Fig. 4H*
Member B (7 minutes ago)-Depart begin date changed from 11/30/09 11:00AM to 11/30/09 (9:00 AM)
Member A (10 minutes ago)-Proposal created
Member B (32 minutes ago)-Proposal created 454b
[All Members][Member Activity][Matching Members]  *Fig. 4I*   455b
Member B ☺☺☺                              100% Match
From:          To:              Date Range:  Time:     Seats:
Omaha, NE(OMA) New York, NY(LGA) 11/30/09    9:00 AM   2

457
*Fig. 4J*

My Matches

The following members match your flight details 100%:
11/30/2009
☑ Member B   -2 seats (INVITE TO BOOK →)
458 (FLY BY MYSELF →)

Fig. 5A

Invitation #1330 — Member A (logout)

Return to Negotiation page
Current status of this invitation is: Open.
Please register your response to this invitation below.

From: Omaha, NE (OMA)  To: New York, NY (LGA)  Date: 11/30/09  Time: 9:00AM Invite Expires 5 dys 13hrs 3 mins

Total Passengers: 4  Total Flight Cost: $18,935.53

| | Seats | Est. Cost | Status | | Close By |
|---|---|---|---|---|---|
| Member B | 2 | $9,367.76 | Awaiting Response | | |
| Member A | 2 | $9,367.76 | [dropdown] | | 11/29/2009 |

Dropdown options:
Yes
No, need more seats filled
No, would like fewer seats filled
No, not ready to book yet
No

UPDATE

Fig. 5B

Invitation #1330 — Member A (logout)

Return to Negotiation page
Current status of this invitation is: Open.
Please register your response to this invitation below.

From: Omaha, NE (OMA)  To: New York, NY (LGA)  Date: 11/30/09  Time: 9:00AM Invite Expires 5 dys 13hrs 3 mins

Total Passengers: 4  Total Flight Cost: $18,735.53

| | Seats | Estimated Cost | Status | Close by |
|---|---|---|---|---|
| Member B | 2 | $9,367.76 | Awaiting Response | |
| Member A | 2 | $9,367.76 | Yes | 11/29/2009 |

Your card will not be charged until all parties agreed to the negotiated terms
Please enter your credit card information and your passenger list below.

Billing Info
First Name: A   Last Name: Member
Address 1: 123 Street
City: Omaha   State: NE   ZIP: 12345
Email:
Card Type: AMEX   Card number: 123456789
Expiration date: 03 / 2012   CVC number: 123

Passenger List:
1: Member A
2: Jane Smith

UPDATE

Fig. 5C

Invitation #1330 — Member A (logout)

From: Omaha, NE (OMA)  To: New York, NY (LGA)  Date: 11/30/09  Time: 9:00AM Invite Expires 5 dys 13hrs 3 mins Current status of this invitation is Open.
Thank you for registering your response of Yes.
Your credit card has been authorized for the amount of $9,367.67, but will only be charged when all members accept the Invitation.

We are currently waiting for other members of the Invitation to register their response. You will be updated by email Immediately after they do so.

SYSTEM AND METHOD FOR NEGOTIATING A SHARED FLIGHT ITINERARY

FIELD OF THE INVENTION

This application claims the benefit of U.S. Provisional Application No. 61/105,658, filed on Oct. 15, 2008. The present invention relates generally to air charter brokerage operations regulated under 14 CFR 135 and 121 and more particularly, relates to a system and method whereby an air charter brokerage's service enables users with similar or matching travel plans to find and contact each other to directly negotiate a shared flight itinerary, including departure and destination location as well as date and time. The invention is further disclosed as a system and method to enable said users to directly book the shared itinerary via a website where said air charter brokerage service which will provide a charter aircraft.

DESCRIPTION OF THE PRIOR ART

Private air travel has many advantages over its commercial alternative. In the US, private aviation offers access to ten times as many airports as commercial airlines. According to current statistics, more than 90 percent of the US population lives within 30 minutes of one of the more than 5,000 general aviation airports, compared to only 20 percent of the US population living within 30 minutes of the less than 500 airports serviced by commercial airlines. Especially for business users the use of smaller airfields and/or private aviation facilities means more flexibility, shorter distances to the airport, shorter distances to clients, less crowding, more comfort, more privacy, and more productivity. However, a relative disadvantage of private air travel is the higher cost per seat, since private aircraft tend to have far fewer available seats between which the cost of the trip may be shared.

To address the relatively high cost of private air travel, different aircraft ownership and aircraft use models have been established. The basic approach to private air travel is full ownership and full control of the aircraft by a user (e.g., an individual person, a business, etc.). However, full ownership also means liability for the full cost associated with the acquisition, operation and maintenance of the aircraft, regardless of whether it is utilized for a trip or just sitting idle or whether only one or all available seats of the airplane are occupied.

To ease the financial burden associated with aircraft ownership, many owners prefer to only purchase a share in an airplane and thus divide the cost liability among all share owners. These arrangements are commonly referred to fractional ownership. Fractional owners are typically liable for their initial share of the purchase price, a monthly management fee, an hourly fee per flight hour used by the fractional owner.

Many users do not want to commit to full or fractional ownership of an aircraft, but still want to enjoy the advantages of private aviation while having better control of the associated costs. For this type of user, so called on-demand charter solutions are available. A user typically contacts one of the many available aircraft charter operators or charter aircraft brokers (collectively, "air charter brokerage") and requests an airplane for the desired flight itinerary, which includes information about the number of travelers, the departure location, the departure date and time, and the arrival location. Thus, the user negotiates directly with the charter operator. The charter operator will then arrange for an aircraft to meet the desired itinerary. Typically, users of chartered aircraft pay on a trip by trip, pay as you go basis. However, in addition to being charged for the actual flight time, the user may also be charged for empty return flights or repositioning of the aircraft. In addition, the user must charter the entire plane and not only individual seats.

The Federal Aviation Administration ("FAA") regulates on-demand charter and commuter operations in 14 CFR 135 and 121. On-demand charter operators and commuter operators require a specific certificate to conduct their operations under 14 CFR 135 and 121.

14 CFR 119.3 defines commuter operations, in relevant part, as "any scheduled operation conducted by any person operating [certain] types of aircraft [ . . . ] according to the published flight schedules." 14 CFR 119.3 further defines scheduled operations as "any common carriage passenger-carrying operation for compensation or hire [which] offers in advance the departure location, departure time, and arrival location." Furthermore, any passenger-carrying operation that is conducted as a public charter operation under 14 CFR 380 (Public Charters) is not included under such scheduled operations. In other words, commuter operations are authorized to conduct and offer to the public pre-existing, i.e., scheduled flights, whereby the flight parameters of departure location, departure time and arrival location are non-negotiable.

14 CFR 119.3 defines on-demand operations, in relevant part, as any passenger-carrying operations conducted as a public charter under 14 CFR 380 or any operations in which the departure time, departure location, and arrival location are specifically negotiated with the customer. In addition, 14 CFR 380.2 defines charter flight, in relevant part, as a flight operated under a charter contract and as such charter flights do not include scheduled air transportation sold on an individually ticketed or individually waybilled basis. In other words, on-demand charter operations are not authorized to conduct and offer to the public pre-existing, i.e., scheduled flights that are individually ticketed, but can only offer on-demand services whereby the departure location, departure time and arrival location are specifically negotiated between the customer and the charter operation before the flight is scheduled. Unlike a scheduled flight, which will generally take place with or without a particular paying customer, an on-demand charter flight will not take place until negotiated between the customer and the air charter operator.

Therefore, current attempts in the charter industry to sell open individual seats on "scheduled" flights or individual seats on empty "scheduled" one-way flights are arguably in violation with FAA rules and regulations. Still, there is a need to conduct operation of on-demand charter flights which minimizes open seats and empty flights on charter aircraft, which are in compliance with FAA rules and regulations.

The prior art of matching travelers' proposed travel plans in order to efficiently consolidate itineraries to share the cost of travel is plentiful. U.S. Pat. No. 7,080,019, hereby incorporated by reference, teaches a method which enables travelers to discover other travelers with similar and compatible travel plans, for purposes of contacting them and negotiating shared travel agreements.

United States Publication Number 2004/0267580, hereby incorporated by reference, teaches a system and method, which facilitates the consolidation of users, automatically via an interactive media, so as to share a desired commodity with the intended purpose of reducing the cost-of-use to each user. More specifically, individual passengers wanting to travel on a private aircraft, from a departure of their choice, to a destination of their choice, at a time and date of their choice, can share the costs of renting said aircraft among themselves.

United States Publication Number 2006/0020496, hereby incorporated by reference, teaches a system whereby a user enters a trip, seeking an individual seat on a charter aircraft. Available charter operators and aircraft are then selected from a database using scheduling and pricing algorithms to match the passenger's request to existing flights and newly created flights.

However, there is currently no system which provides users of on-demand air charter operations with an FAA compliant completely integrated system for itinerary consolidation. It would therefore be desirable if users could share the cost of a private charter aircraft by accessing an online meeting place which enables users to directly negotiate the creation of shared flight itineraries before the flight is scheduled and the aircraft is chartered. In addition, the users who collectively negotiated and created a shared flight itinerary would then be able to directly schedule the shared flight and collectively charter an aircraft using the services of a charter aircraft brokerage service.

OBJECTS OF THE INVENTION

Accordingly, it is an object of this invention to provide a system and method for enabling users to propose their desired flight itineraries to an open forum of other users.

It is another object of this invention to provide a system and method for enabling users to search for open proposed flight itineraries of other users that match or are similar to the searching user's travel plans, in order to find and directly negotiate with each other a common shared flight itinerary that includes departure and destination location as well as date and time.

It is yet another object of this invention to provide a system and method for enabling users to invite one another to directly book a common shared flight itinerary, on a per seat, pro rata basis, whereby an air charter brokerage service will provide a charter aircraft for the shared flight itinerary.

SUMMARY OF THE INVENTION

Accordingly it is an advantage of the present invention to enable users to search for open proposed flight itineraries of other users that match or are similar to the searching user's travel plans, in order to find and directly negotiate with each other a common shared flight itinerary.

It is a further advantage of the present invention to enable users to invite one another to directly book a common shared flight itinerary, on a per seat, pro rata basis, whereby an air charter brokerage service will provide an charter aircraft for the shared flight itinerary.

To achieve the foregoing and other advantages, and in accordance with one aspect of the present invention, a method for allowing searching users and proposing users to directly negotiate a shared flight itinerary for an on-demand charter flight is provided, wherein the method comprises the steps of: permitting access to a computer software application; enabling a proposing user to propose a flight itinerary to be shared with searching users, said proposed flight itinerary having associated therewith a plurality of flight parameters, wherein one of the plurality of flight parameters is the proposed departure time of day, and wherein said proposed departure time of day further must not be expressed as an exact numerical value; associating said proposed flight itinerary with the proposing user that proposed said flight itinerary and uniquely identifying and storing said proposed flight itinerary and associated plurality of flight parameters in a computer searchable database associated with said software application, said database storing a plurality of proposed flight itineraries, each having associated flight parameters; enabling a searching user to enter at least one of a plurality of search parameters and searching said database for proposed flight itineraries having associated flight parameters that match at least some of said search parameters; displaying to said searching user all proposed flight itineraries having at least some matching flight parameters; enabling said searching user to directly access one or more of said matching proposed flight itineraries to directly negotiate with one or more of said proposing users that have proposed said displayed matching flight itineraries; whereby at the beginning of said negotiation requiring the entry of a numerical value for a specific desired departure time of day by said searching user to in order to negotiate a shared flight itinerary; and enabling the negotiation of one or more of said plurality of flight parameters of said proposed flight itinerary directly between said searching user and said proposing user and storing updated flight parameters in said database, whereby an agreement between said searching user and said proposing user with respect to all of said plurality of said proposed flight parameters causes that proposed flight itinerary to become a common shared flight itinerary.

In accordance with another aspect of the present invention, a method for allowing users to directly book a shared flight itinerary for an on-demand charter flight is provided, in which the method comprises the steps of: permitting access to a computer software application providing user accessible flight itineraries; enabling a plurality of users to negotiate directly with each other one or more of a plurality of flight parameters associated with a particular proposed flight itinerary, wherein an agreement between some or all of said users causes said proposed flight itinerary to become a shared flight itinerary; transmitting said flight parameters of said shared flight itinerary to a charter brokerage service for chartering an aircraft for said shared flight itinerary.

In accordance with yet another aspect of the present invention, a computer-based system for negotiating shared flight itineraries for on-demand charter flights is provided, in which the system comprises: a first computer, executing at least a part of a software application for negotiating shared flight itineraries; a data storage device coupled to said first computer, comprising a computer-searchable database; a second computer, having a display and an input device, and capable of accessing said first computer via the Internet and further capable of executing at least a part of said software application for: a) enabling proposing users to propose flight itineraries to be shared with searching users, each of said proposed flight itineraries having associated a plurality of flight parameters, wherein one of the plurality of flight parameters is the proposed departure time of day, and wherein said proposed departure time of day further must not be expressed as an exact numerical value; whereby said software application associates said proposed flight itinerary with the proposing user that proposed said flight itinerary and uniquely identifies and stores said proposed flight itinerary and associated plurality of flight parameters in said computer searchable database; b) enabling searching users to enter at least one of a plurality of search flight parameters to search said data base for proposed flight itineraries having associated flight parameters that match at least some of said search flight parameters; c) displaying matching proposed flight itineraries; d) enabling said searching user to directly access one or more of said matching proposed flight itineraries to directly negotiate with one or more of said proposing users that have proposed said displayed matching flight itineraries, whereby at the beginning of said negotiation said searching user must propose at least a numerical value for a specific desired departure time of day; and e) enabling the ability to negotiate one or more of said plurality of flight parameters of said proposed flight itinerary directly between said searching user and said proposing user, whereby an agreement between said searching user and said proposing user with respect to all of said plurality of said proposed flight parameters causes that proposed flight itinerary to become a common shared flight itinerary.

Still other advantages of the present invention will become apparent to those skilled in this art from the following description and drawings wherein there is described and shown a preferred embodiment contemplated for carrying out the invention. As will be realized, the invention is capable of other different embodiments, and its several details are capable of modification in various aspects without departing from the invention. Accordingly, the drawings and descriptions will be regarded as illustrative and not as restrictive.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 4E depicts one embodiment of a user interface allowing a user to update flight parameters during the negotiation of an open flight proposal;

FIG. 4F depicts one embodiment of a user interface displaying all users that participate in the negotiation of an open flight proposal;

FIG. 4G depicts one embodiment of a user interface displaying all users that have matching or similar flight parameters for a proposed flight itinerary;

FIG. 4H depicts one embodiment of a user interface displaying the negotiation activity of negotiating users;

FIG. 4I depicts one embodiment of a user interface displaying all users that have matching or similar flight parameters for a proposed flight itinerary;

FIG. 4J depicts one embodiment of a user interface allowing a user to invite users with matching flight parameters to book a shared common flight itinerary;

FIG. 5A depicts one embodiment of a user interface allowing a user to enter responses regarding an invitation to book a shared flight itinerary;

FIG. 5B depicts one embodiment of a user interface allowing a user to enter payment information to pay for the user's share of expenses associated with the shared flight itinerary;

FIG. 5C depicts one embodiment of a user interface providing a user with certain information regarding the status of the invitation to book a shared flight itinerary.

DETAILED DESCRIPTION OF THE ILLUSTRATED EMBODIMENT

The disclosed invention provides for a system and method that enables users with similar or matching travel plans to find each other and to directly negotiate with each other a single flight itinerary utilizing a charter aircraft to be shared among them. The disclosed invention further provides for a system and method that enables the users that have successfully negotiated a shared flight itinerary to then directly book the shared flight itinerary, whereby an air charter brokerage service will provide a charter aircraft for the booked shared flight itinerary.

The preferred embodiment of the disclosed invention is a web-based negotiation software application, accessible to registered users via the Internet using a personal computing device and a web browser. The software application may be maintained and hosted by an air charter brokerage service. Users who wish to access the software application via the Internet may be required to register as members of the air charter brokerage service. As part of the registration process, users may be asked to provide certain identifying information, such as name and address, as well as billing information, such as a credit card number. Once users have enrolled as members, they will be asked to set up a username and a password that will allow them to subsequently access the web-based negotiation software application.

1. Negotiating a Shared Flight Itinerary

Figure 1:
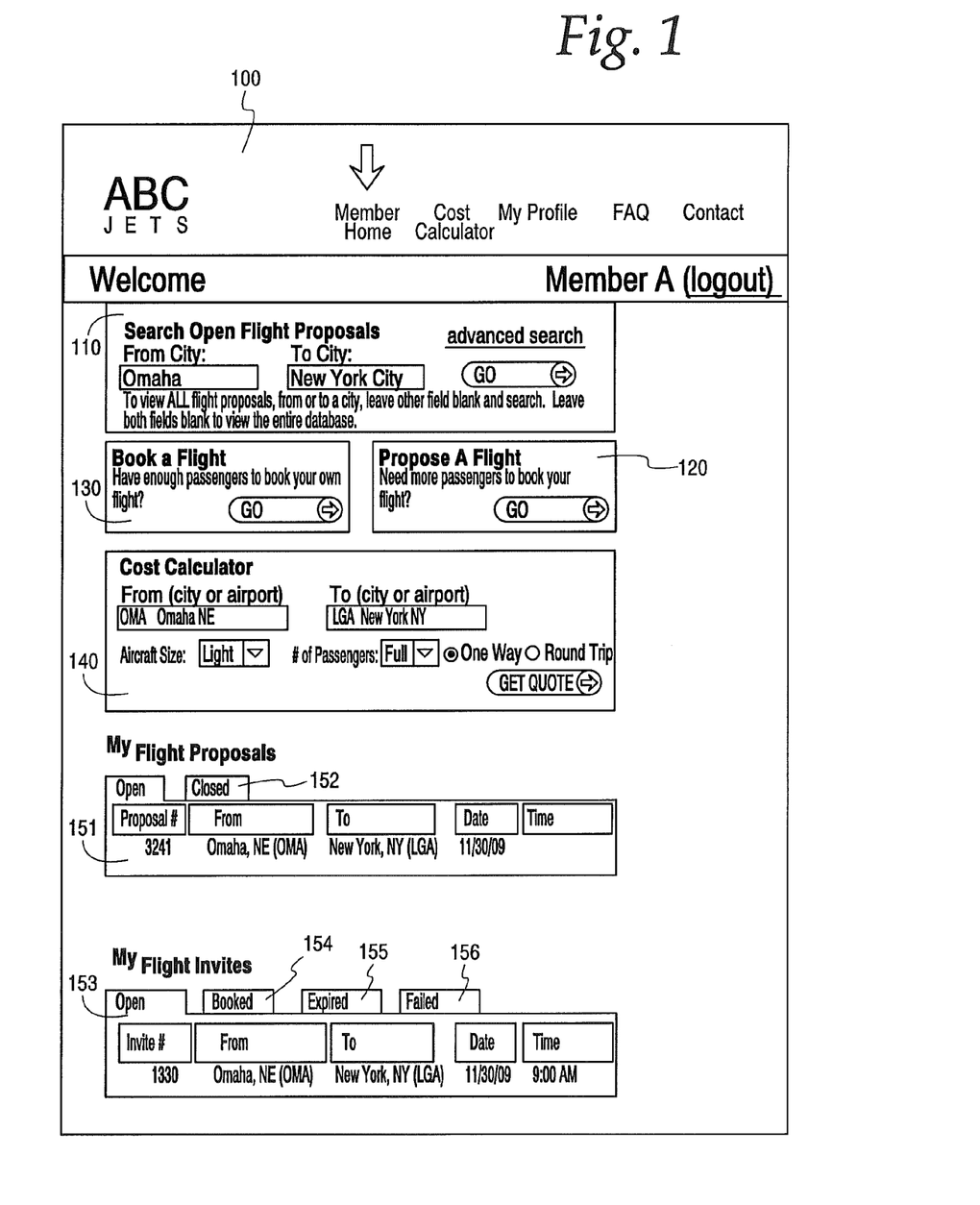
FIG. 1 depicts one embodiment of a user interface allowing a user to, for example, search for proposed flight itineraries or to propose a desired flight itinerary.

In order to negotiate a shared flight itinerary, in the preferred embodiment, a user, i.e., member, must first access the web-based negotiation software application by entering the correct username and password. After gaining access to the application, the user is presented with a user interface such as the one depicted in FIG. 1. FIG. 1 depicts one embodiment of a user interface home screen 100 which presents the user with a number of menus that enable a user to, for example, search for proposed flight itineraries using search open flight proposal menu 110, directly book a flight by using book a flight menu 130, propose a desired flight itinerary by using propose a flight menu 120, and generate a quote for the cost of a particular flight itinerary using cost calculator 140.

In addition, home screen 100 may also display the user's open flight proposals in open flight proposals menu 151 and the user's closed flight proposals in closed flight proposals menu 152, if applicable.

Furthermore, home screen 100 may also display the user's open invitations to book a shared flight itinerary in open flight invites menu 153, the user's booked flight itineraries in booked flight invites menu 154, c) the user's expired flight invites in expired flight invites menu 155, and the user's failed flight invites in failed flight invites menu 156.

Users of the disclosed negotiation software application will have at least two objectives in common: they, 1) enjoy the flexibility and comfort of traveling with a private aircraft, but 2) would like to minimize the associated expenses of on-demand aircraft charter by sharing the flight itinerary with as many other users as possible. In a typical scenario, every user will have in mind a specific desired flight itinerary, but will also be willing to negotiate certain details of the itinerary with other users in order to negotiate a single common flight itinerary to be shared by a plurality of users.

For example, Member A, living in Omaha, needs to be in New York City by noon of Nov. 30, 2009. Ideally, Member A would like to leave Omaha in the morning of Nov. 30, 2009. Member A would also like to share the expense of chartering a private aircraft for the trip from Omaha to New York City and is looking for other users, i.e., members with whom to share a common flight itinerary.

a. Starting a New Negotiation

The Initial Flight Proposal

Before members are able to negotiate a shared flight itinerary with each other, at least some members must provide initial flight proposals. Members proposing flight itineraries are hereinafter referred to as "proposing member(s)" and members searching for open proposed flight itineraries are hereinafter referred to as "searching member(s)."

Figure 2A:
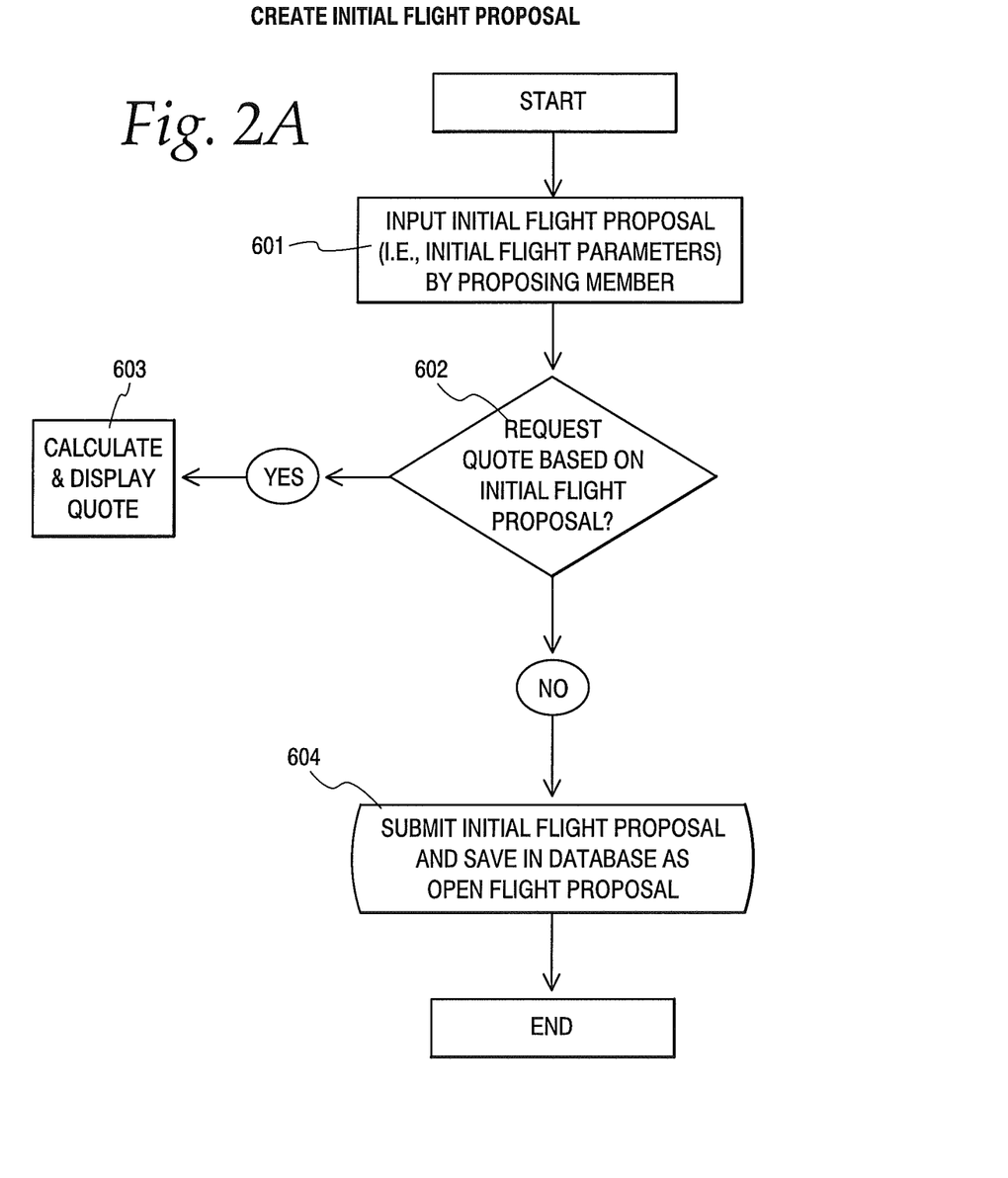
FIG. 2A is a flow chart illustrating the steps comprised in the creation of an initial flight proposal, i.e. proposed flight itinerary.

FIG. 2A provides an overview of the steps that comprise the creation of an initial flight proposal, i.e., a proposed flight itinerary, which is more fully explained below and shown in FIG. 2B. In a first step 601 a proposing member enters an initial flight proposal by entering certain initial flight parameters. In an optional second step 602, the member can request a quote based on the entered flight parameters, which is calculated and displayed to the requesting member in optional step three 603. In a fourth step 604 the initial flight proposal submitted and saved in a searchable database as an open flight proposal.

Figure 2B:
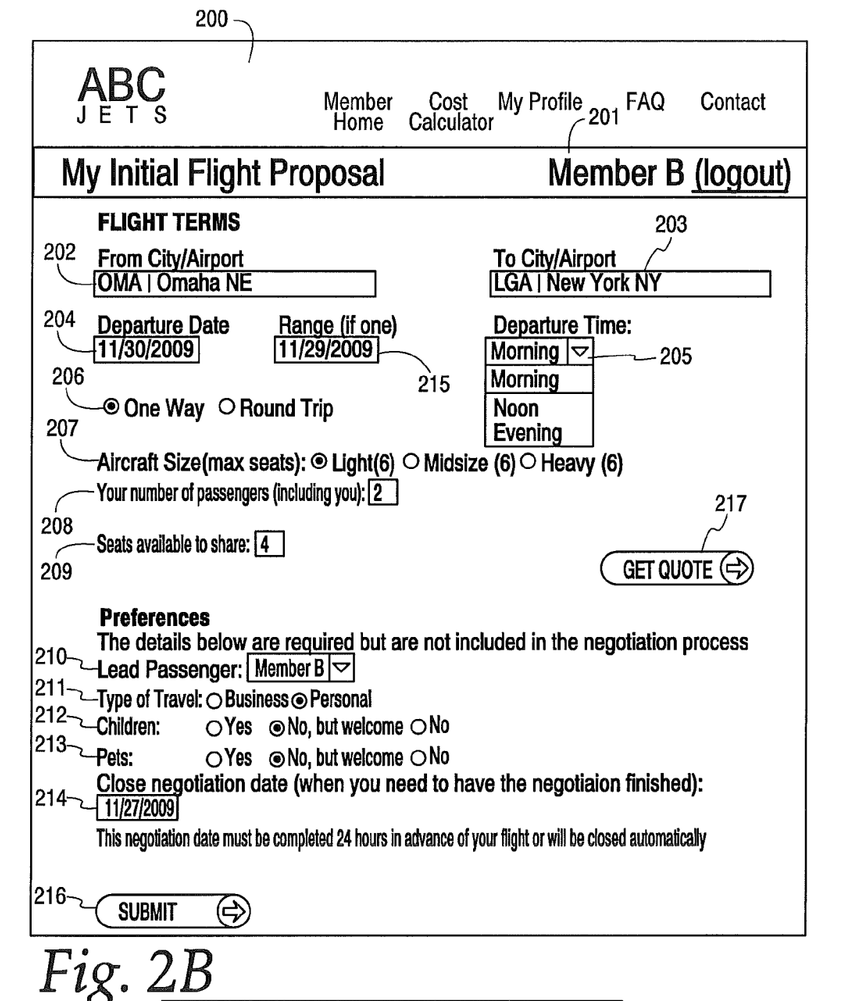
FIG. 2B depicts one embodiment of a user interface allowing a user to input an initial flight proposal.
Figure 2C:
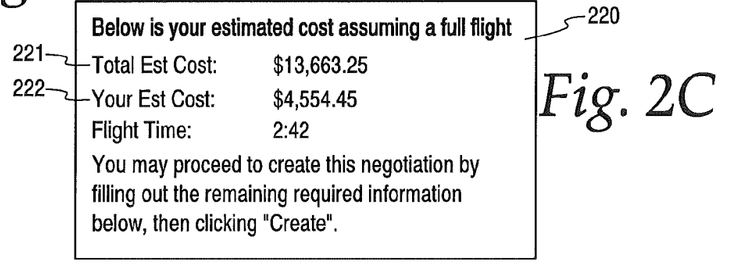
FIG. 2C depicts one embodiment of an estimated cost display screen.

FIGS. 2B through 2C show a preferred embodiment of a user interface, in particular, initial flight proposal interface 200 which enables a member to propose an initial flight itinerary and to request a quote based on the entered flight parameters. In the example shown in FIGS. 2B and 2C, proposing Member B 201 has entered initial flight proposal interface 200 after having selected the propose a flight menu 120 on home screen 100 as shown in FIG. 1. The initial flight proposal interface 200 allows proposing Member B 201 to enter certain flight parameters (or flight terms) that make up the proposing member's initial flight proposal. As such, a proposing member enters at least a departure location in departure location menu 202 and a destination location in destination location menu 203. In the example shown in FIG. 2B, proposing Member B 201 has entered Omaha as the departure location and New York City as the destination location. Furthermore, a proposing member also enters a departure date in departure date menu 204 and a departure time frame in departure time menu 205, such as, for example, "morning," "noon," "afternoon" or "evening."

The disclosed negotiation software application does not allow proposing members to enter an exact departure time, since proposing an exact numerical time indication, such as, for example, 6:35 PM or 18:35, could be interpreted as a specific, i.e., "scheduled" departure time.

As mentioned above, current FAA regulations do not allow on-demand aircraft charter services to post "scheduled flights," whereby a scheduled flight is defined as having a departure location, a destination location and a specific departure time. However, and as will be further explained below, once a searching member has entered the negotiation, all flight parameters of an open proposed flight itinerary, including a specific numerical departure time, are available for negotiation.

The preferred embodiment of FIG. 2B provides for a proposing member to define additional flight parameters of a proposed flight itinerary. A proposing member can indicate whether the proposed flight itinerary is to be a one way trip or a round trip by making the applicable selection in one way/round trip selector 206. In addition, the size of the desired charter aircraft or the maximum number of available passenger seats can be indicated in aircraft size selector 207. The number of passengers associated with the proposing member can be entered in unavailable seats indicator 208 and the number of seats that the proposing member is willing to share with other members can be entered in available seats indicator 209. Furthermore, the preferred embodiment of FIG. 2B provides for a proposing member to identify the lead passenger of the proposed flight itinerary in lead passenger menu 210. The type of travel, for example, "business" or "personal" can be selected in type of travel selector 211. Whether the proposing member is planning to take along children or pets, or whether children or pets are welcome, can be indicated in child policy selector 212 and pet policy selector 213, respectively. A proposing member can also indicate by what date the negotiation must be finished in close negotiation date menu 214. After the selected date the proposed flight itinerary will no longer be available to searching members. A proposing member may also provide a range of possible departure dates in departure date range menu 215 indicating greater flexibility as to the departure date.

In this Example, Member B has entered the departure location "Omaha", the destination location "New York," a desired departure date of "November 30," an alternative desired departure date of "November 29," and a desired departure time frame of "morning." Furthermore, proposing Member B indicated that the proposed itinerary is for a one way flight only, that the proposed charter aircraft size is "light" with a maximum of 6 passenger seats, whereby proposing Member B will occupy 2 seats, leaving 4 seats to be shared with other members. Finally, proposing Member B identified Member B as the lead passenger, and indicated that the proposed trip will be personal in nature, and children and/or pets are welcome. The negotiation must be closed by "November 27."

After a proposing member has entered all required initial flight parameters in initial flight proposal interface 200, the entered initial flight parameters will be uniquely associated with the proposing member and stored in an accessible and searchable database associated with the air charter brokerage service so that other searching members can find the open proposed flight itineraries. In the preferred embodiment of FIG. 2B, selecting submit flight proposal 216 causes the disclosed negotiation software application to uniquely associate and identify said flight parameters as Member B's 201 proposed flight itinerary and to save said flight itinerary in an accessible and searchable database.

In addition, the preferred embodiment as shown in FIG. 2B allows a proposing member to request a quote for the proposed flight itinerary based on the entered flight parameters. In particular, selecting get quote 217 causes the disclosed negotiation software application to calculate the estimated cost of the flight itinerary based on entered flight parameters.

FIG. 2C shows a preferred embodiment of an estimated cost display screen 220 that is part of the cost calculator 140 shown in FIG. 1. In particular, estimated cost display screen 220 may display, among other information, the total estimated cost 221 and the estimated share 222 of the cost attributable to the member requesting the quote.

The disclosed negotiation software application permits a plurality of proposing members to enter end submit initial flight proposals to be stored in the accessible and searchable database. The larger the pool of proposing and searching members, the more likely participating members will be able to successfully negotiate shared flight itineraries.

b. Searching Open Flight Itineraries

Typically, a member entering the negotiation application will first want to search for open flight proposals submitted by proposing members, whereby the objective is to find proposed flight itineraries that have matching or at least similar flight parameters compared to those of the searching member's own desired flight parameters.

Figure 3A:
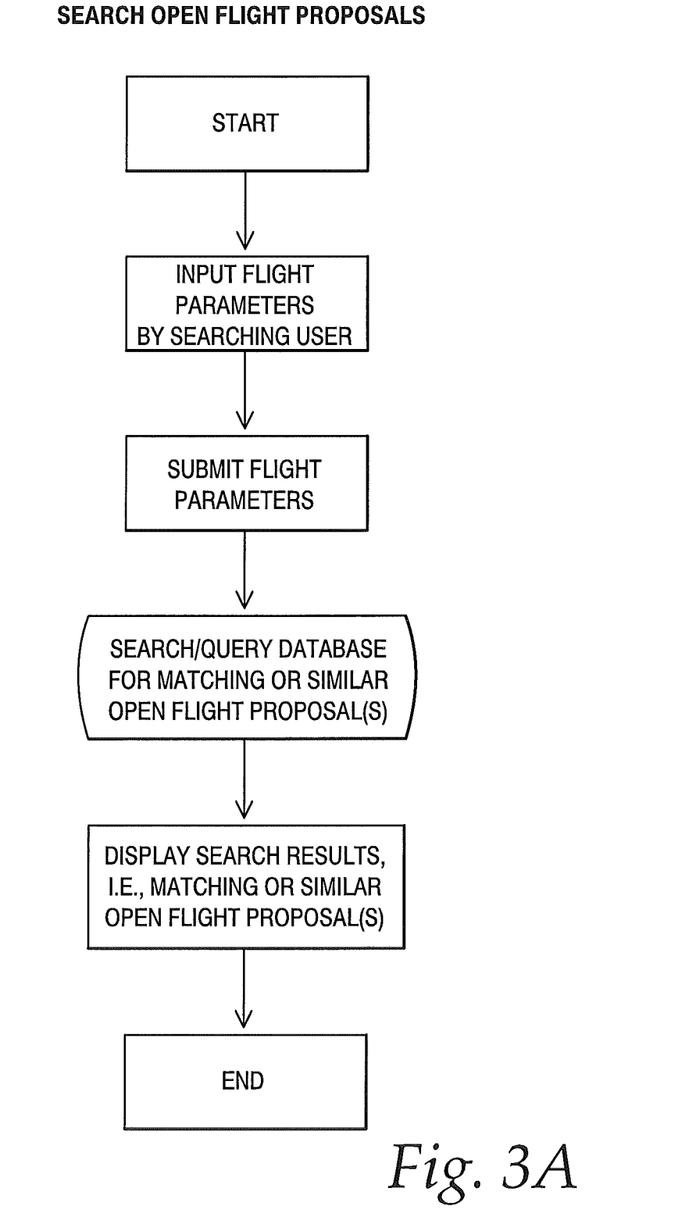
FIG. 3A is a flow chart illustrating the steps comprised in the search for open flight proposals, i.e., proposed flight itineraries.

FIG. 3A provides an overview of the steps that comprise the search for an open flight proposal, i.e., a proposed flight itinerary, which is more fully explained below and shown in FIGS. 3B and 3C. In a first step 605 a searching member enters the desired flight parameters. In a second step 606, the searching member submits the entered desired flight parameters. Next, in a third step 607, the disclosed negotiation software application searches the associated database of proposed flight itineraries for those proposed flight itineraries that have either matching or similar flight parameters. Finally, in a fourth step 608 the application displays to the searching member the search results, i.e., all matching or similar proposed flight itineraries.

Figure 3B:
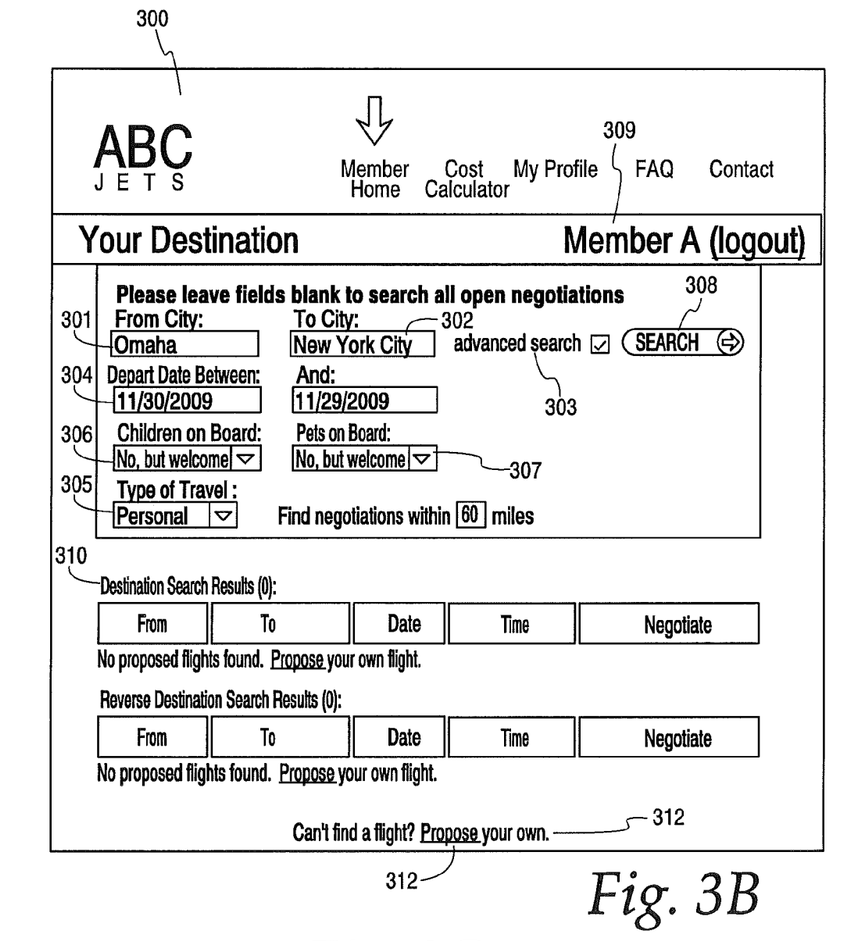
FIG. 3B depicts one embodiment of a user interface allowing a user to search open flight proposals, i.e., proposed flight itineraries.
Figure 3C:
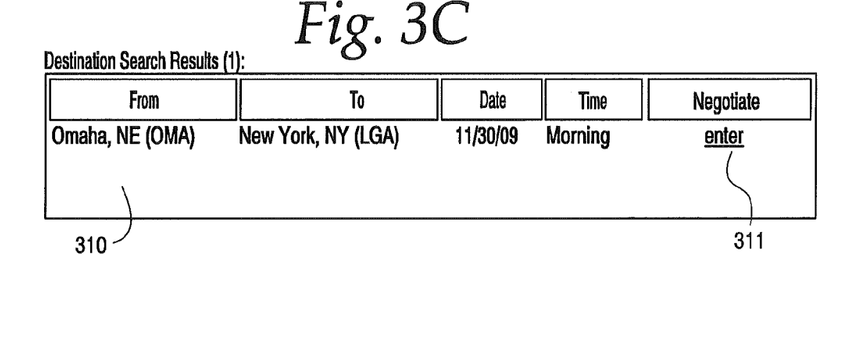
FIG. 3C depicts one embodiment of a user interface for displaying the search results of a search for open flight proposals.

FIGS. 3B through 3C show a preferred embodiment of a user interface, in particular, search flight proposal interface 300 which enables a searching member to search for open flight proposals (or "open negotiations") that have flight parameters that are matching or are similar to the searching member's desired flight parameters. In the example shown in FIG. 3B, searching Member A 309 has entered search flight proposal interface 300 after having selected search open flight proposal menu 110 on home screen 100 as shown in FIG. 1. The search flight proposal interface 300 allows searching Member A 309 to enter certain flight parameters (or flight terms) that make up the searching member's desired flight itinerary. As such, a searching member may enter desired flight parameters such as, for example, a desired departure location in departure location search menu 301 and desired destination location in destination location search menu 301.

Furthermore, a searching member may also select to conduct an advanced search by selecting advanced search selector 303 to further define the search for a proposed flight itinerary, by selecting a certain desired departure date range 304, the desired type of travel 305, i.e., personal or business, and the desired policy regarding the transport of children and pets, in desired children policy selector 306 and desired pet policy selector 307. After all desired flight parameters have been entered using search flight proposal interface 300, selecting search 308 causes the disclosed negotiation software application to start the search of its associated database for open flight proposals with matching or similar flight parameters. In order to have the disclosed negotiation software application to display all open proposed flight itineraries that are stored in the associated database at the time a searching member conducts the search, the searching member simply selects search 308 without entering any desired flight parameters. Of course, the more desired flight parameters are entered the narrower the search results.

In the example shown in FIG. 3B, Member A 309 has entered "Omaha" as the desired departure location, "New York City" as the desired arrival location, a desired departure date range of between "November 30" and "November 29", and indicated that the desired type of travel is personal and that children and pets are welcome.

FIG. 3C shows a preferred embodiment of a user interface, in particular a portion of search flight proposal interface 300, i.e., destination search result menu 310. In this example, the disclosed negotiation software application, in response to searching Member A selecting search 308, has retrieved all proposed flight itineraries that match or are similar to searching Member A's desired flight parameters. In this example, the disclosed application displays the open flight itinerary of Member B. By selecting enter negotiation 311, searching Member A can access Member B's proposed flight itinerary to directly negotiate all flight parameters of the proposed flight itinerary. Should the search fail to produce any proposed flight itineraries suitable to the searching member, the searching member may enter a new flight proposal by selecting propose new flight itinerary 312, which will open up a new initial flight proposal interface 200 as shown in FIG. 2B and the searching member becomes a proposing member, whereby the steps explained with regards to FIGS. 2A through 2C may be repeated.

c. Negotiating a Shared Flight Itinerary

Figure 4A:
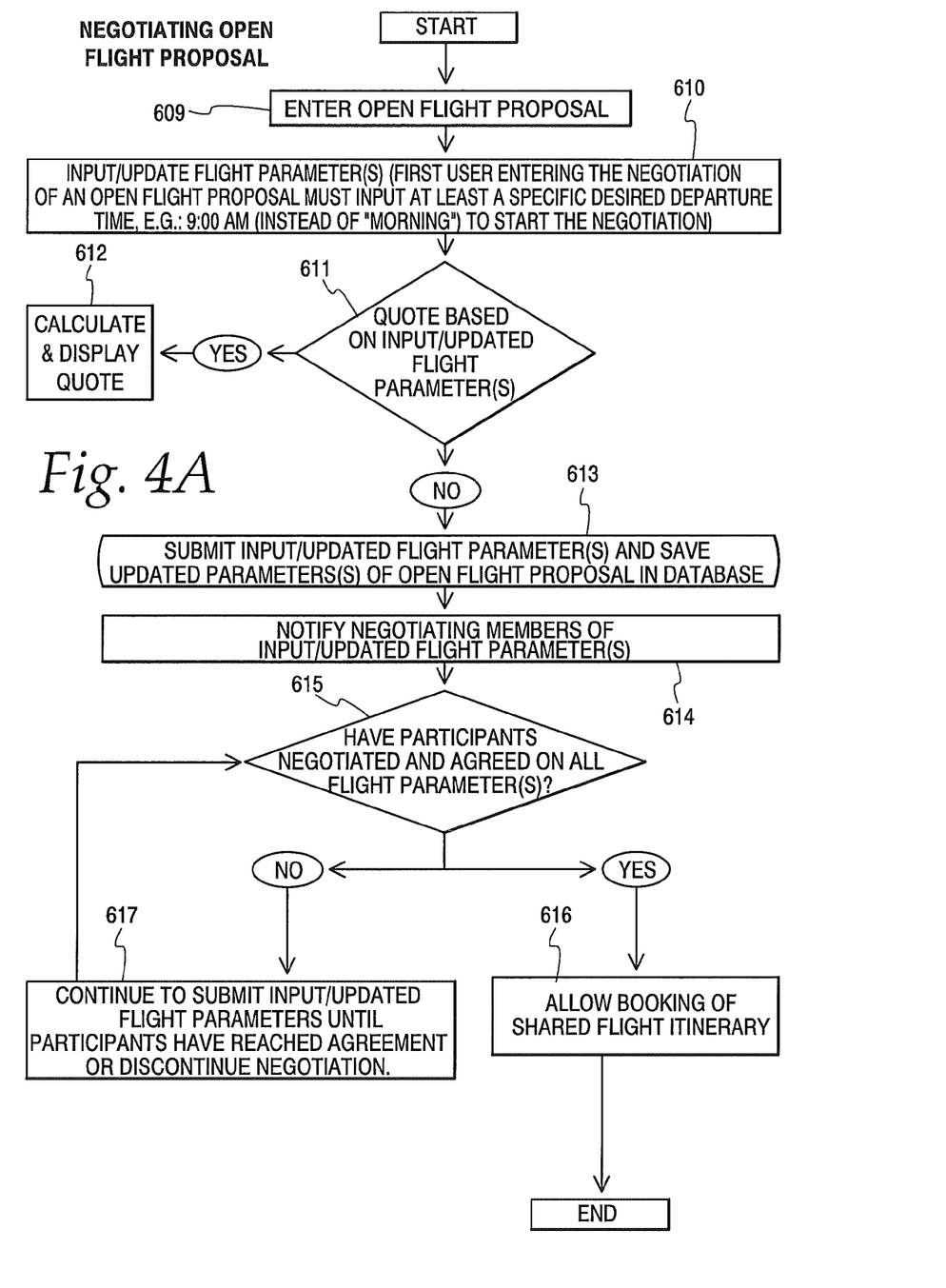
FIG. 4A is a flow chart illustrating the steps comprised in the negotiation of a shared flight itinerary.

FIG. 4A provides an overview of the steps that comprise the negotiation of a shared flight itinerary which is more fully explained below and shown in FIGS. 4B through 4J. In a first step 609 a member enters an open flight itinerary, i.e. open flight proposal. In a second step 610 the member enters or updates certain flight parameters. However, the first member entering the negotiation of an open flight proposal must input at least a specific departure time, for example, 9 AM instead of a departure time frame such as "morning." In an optional third step 611, the member can request a quote based on the entered/updated flight parameters, which is calculated and displayed to the requesting member in an optional fourth step 612. In a fifth step 613 the entered/updated flight parameters of the open flight proposal are submitted and saved in a searchable database. In a sixth step 614, all members participating in the open flight proposal are notified of the entered/updated flight parameters. In a seventh step 615, the negotiating members may or may not have reached agreement on all flight parameters. If all negotiating members have reached agreement, they are allowed to book the shared flight itinerary in an eighth step 616. If the negotiating members have not reached agreement on all flight parameters, they may, in a ninth step 617, continue to submit updated flight parameters until agreement has been reached, or some or all negotiating members may decide to discontinue the negotiation.

Figure 4B:
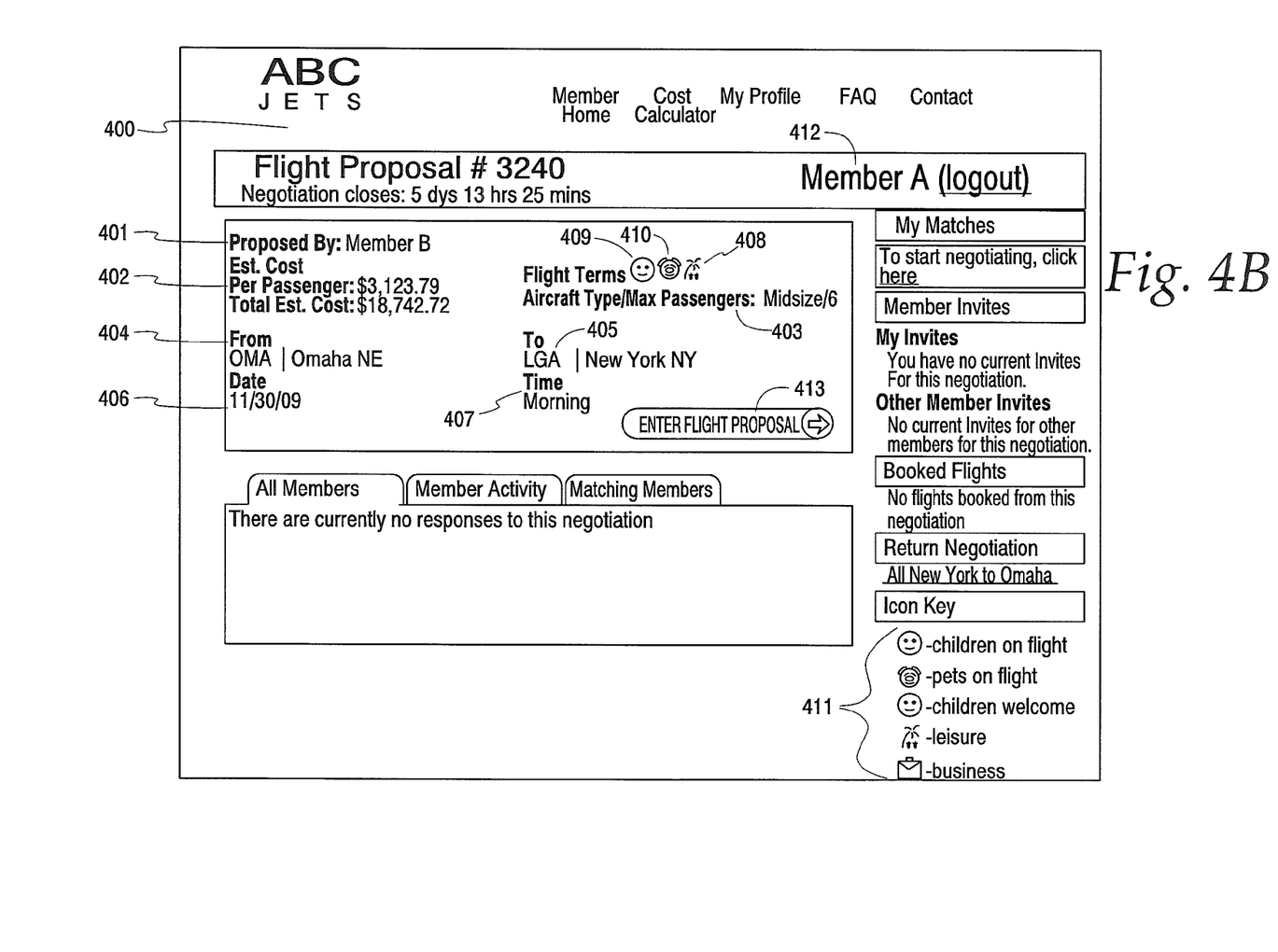
FIG. 4B depicts one embodiment of a user interface allowing a user to participate in the negotiation of an open flight proposal, i.e. proposed flight itinerary.

FIG. 4B shows a preferred embodiment of a user interface, in particular, flight proposal detail menu 400 which enables a searching member to enter a selected open flight proposal to directly negotiate its flight parameters with the proposing member. In this example, flight proposal detail menu 400 was accessed by searching Member A 412 by selecting enter negotiation 311 on destination search result menu 310 as shown in FIG. 3C. Flight proposal detail menu 400 provides the searching member with all proposed flight parameters entered by the proposing member, such as, for example, proposing member's name 401, the estimated cost 402, aircraft size 403, proposed departure location 404, proposed destination location 405, proposed departure date 406 and proposed departure time frame 407. The type of travel 408 and children 409 and pet policies 410 are also indicated and may be shown in form of icons corresponding to icon key 411. In this example, searching Member A 412 can now directly contact proposing Member B 401 by selecting enter flight proposal 413 to start the negotiation of proposing Member B's open flight itinerary.

Figure 4C:
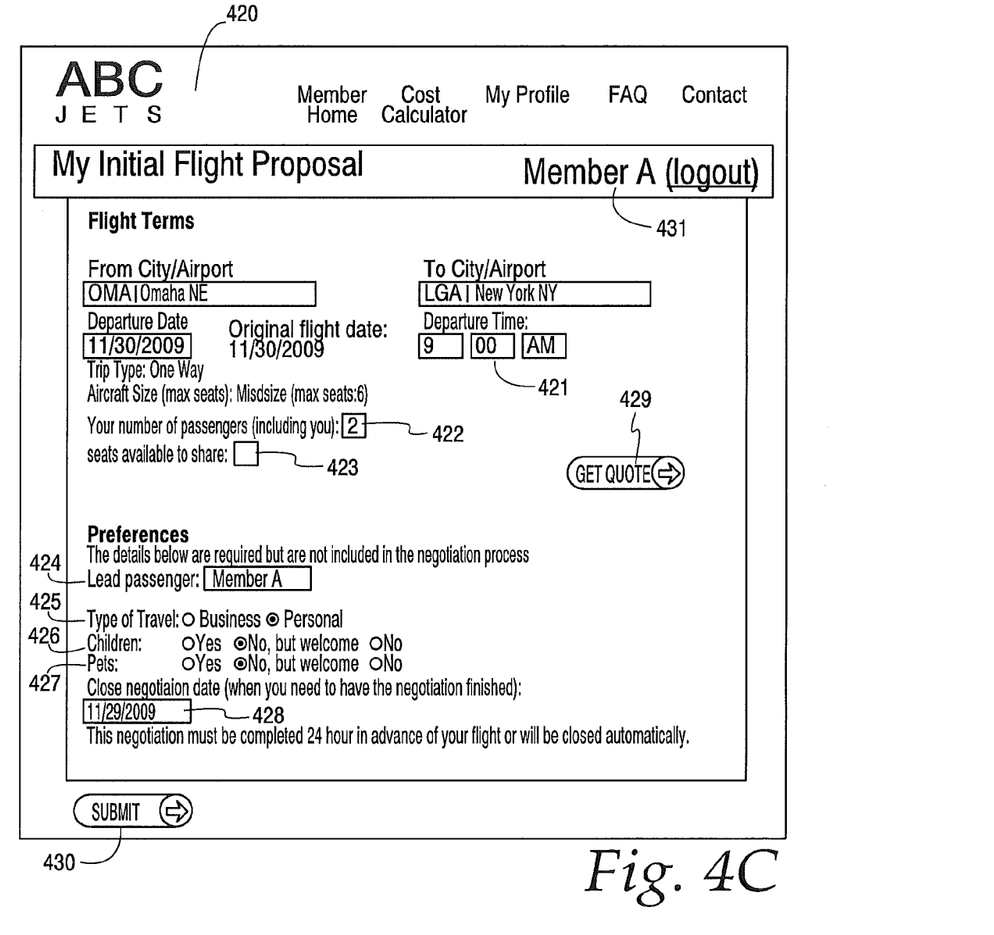
FIG. 4C depicts one embodiment of a user interface allowing a user to negotiate an open flight proposal by entering certain flight parameters.
Figure 4D:
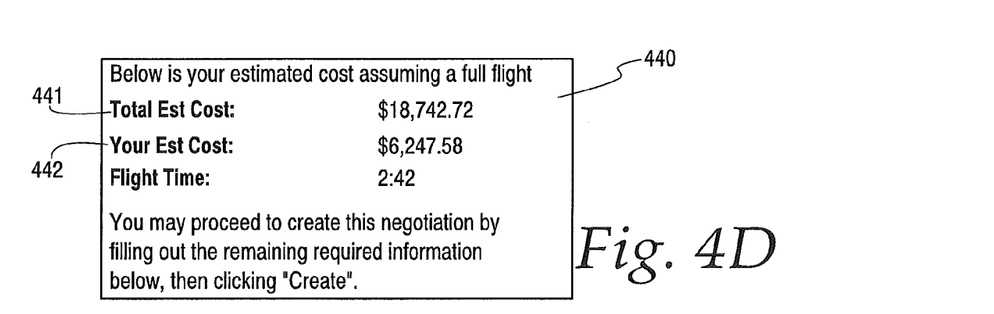
FIG. 4D depicts one embodiment of a cost calculator.

FIG. 4C shows a preferred embodiment of start negotiation interface 420, which allows a searching member to start the negotiation of the selected open flight proposal. This start negotiation interface 420 is largely identical to the initial flight proposal interface 200 shown in FIG. 2B but for one critical difference regarding the specificity of the required departure time parameter. Unlike initial flight proposal interface 200 of FIG. 2B that did not allow a proposing member to enter a specific numerical time indication in departure time menu 205 for the reasons explained above, start negotiation interface 420, shown in FIG. 4C, now requires that the first searching member to enter or start the negotiation of the selected open flight proposal must enter a specific numerical time indication in departure time menu 421 of start negotiation interface 420. Furthermore, the number of passengers associated with the searching member can be entered in passenger number indicator 422 and the number of seats that the searching member is willing to share with additional searching members can be entered in available seats indicator 423. Furthermore, the lead passenger of the searching member's travel party can be identified in lead passenger menu 424. The type of travel can be selected or confirmed in type of travel selector 425. Whether the searching member is planning to take along children or pets, or whether children or pets are welcome, may be indicated in children policy selector 426 and pet policy selector 427, respectively. A searching member can also indicate by what date the negotiation must be finished in close negotiation date menu 428.

In addition, the preferred embodiment of start negotiation interface 420 as shown in FIG. 4C allows a searching member to request a quote for the flight itinerary being negotiated based on the flight parameters entered at the time of the quote request. In particular, selecting get quote 429 causes the disclosed negotiation software application to calculate the estimated cost of the flight itinerary based on entered flight parameters FIG. 4D shoes a preferred embodiment of an estimated cost display screen 440 that is part of the cost calculator 140 shown in FIG. 1. In particular, estimated cost display screen 440 may display, among other information, the total estimated cost 441 and the estimated share 442 of the cost attributable to the member requesting the quote.

In this example, illustrated in FIG. 4C, searching Member A 431 has entered 9 AM in departure time menu 421 in accordance with Member A's desired departure time. Member A 431 also indicated the need for 2 seats in passenger number indicator 422. In the preferred embodiment of FIG. 4C, selecting submit flight proposal 430 causes the disclosed negotiation software application to update the database with the entered flight parameters and to also notify all other members participating in the negotiation of the recently updated flight parameters. Such notification may be via electronic message to participating members and is generated every time the proposed flight itinerary is updated. The software application further has the ability to generate a notification to all searching members whose desired destination location is identical to a proposing member's proposed destination location, as soon as the proposing member has proposed, i.e., submitted such destination location to the application's database.

FIG. 4E shows a preferred embodiment of negotiation interface 450 allowing a negotiating member to further update the flight parameters of the proposed flight itinerary being negotiated after the negotiation has been initiated. Negotiation interface also allows a member to monitor the negotiation activity of other members. After every update of flight parameters, a member must select update terms 451, in order to cause the disclosed negotiation software application to update its associated database of proposed flight itineraries. Furthermore, members are able to leave the ongoing negotiation at any time before the proposed flight itinerary has become a shared flight itinerary by selecting drop out 452.

FIG. 4F shows a preferred embodiment of a portion of negotiation interface 450, i.e., all members list 453, which lists all members currently participating in the negotiation. This list is constantly updated by the disclosed negotiation software application. In this example, all member list 453 lists only Member A and Member B as negotiating a flight itinerary between Omaha and New York City and in particular, that Member B has proposed to depart Omaha for New York City at 11 AM on Nov. 30, 2009, whereas Member A has proposed a departure time of 9 AM on Nov. 30, 2009.

FIG. 4G shows a preferred embodiment of a portion of negotiation interface 450, i.e., matching members list 454a, which lists all members that have matching or similar flight parameters. Matching member list 454a also includes an indication of how similar the respective flight parameters are. In this example, the matching members list 454a displayed as part of Member A's 443 negotiation interface 450 indicates through match indicator 455a that at this time Member B's proposed flight parameters are a 75% match to Member A's proposed flight parameters. There is not a 100% match in this example because Member A and Member B have not yet agreed on a common departure time, since Member A has proposed 9 AM and Member B has proposed 11 AM.

FIG. 4H shows a preferred embodiment of a portion of negotiation interface 450, i.e., member activity 456, which tracks the negotiation activity of all members participating in the negotiation of the flight itinerary. In this example, member activity 456 shows the creation of Member A's and Member B's proposals, and also shows in the last entry that Member B has updated the proposed departure date from 11 AM to 9 AM. This update by Member B has now generated a 100% match between the flight parameters of Member A and Member B as indicated in matching members list 454b, and in particular by match indicator 455b as shown in FIG. 4I.

FIG. 4J shows a preferred embodiment of a portion of negotiation interface 450, i.e., my matches 457, which lists all members whose proposed flight parameters are identical, i.e., a 100% match. In this example, after Member B had updated the departure time from 11 AM to 9 AM, my matches 457 now lists Member B as having 100% matching flight parameters compared with Member A's flight parameters, that is, both Member A and Member B have agreed to depart Omaha for New York City on Nov. 11, 2009 at 9 AM. Member A now has the option to invite Member B to book the now common shared flight itinerary by selecting invite to book 458.

The software application further has the ability to generate a notification to all searching members whose desired destination location is identical to a proposing member's proposed destination location, as soon as the proposing member has proposed, i.e., submitted such destination location to the application's database. Such notification may be in form of an electronic message send to participating members.

2. Booking a Shared Flight Itinerary

While one aspect of the disclosed invention is to enable searching members and proposing members to directly negotiate a shared flight itinerary, such negotiation occurs prior to and independent of the booking and chartering of an aircraft that will carry out the shared itinerary. Therefore, another aspect of the disclosed invention is the ability of users to directly book a successfully negotiated shared flight itinerary.

More particularly, once members have successfully negotiated all flight parameters of a particular proposed flight itinerary, i.e., once all flight parameters are a 100% match, any of the participating negotiating members can invite the other negotiating members to book the negotiated flight itinerary. For example, and as explained above, FIG. 4J shows a preferred embodiment of a portion of negotiation interface 450, i.e., my matches 457, which lists all members whose proposed flight parameters are identical, i.e., a 100% match. In this example, Member A now has the option to invite Member B to book the shared flight itinerary by selecting invite to book 458. In another embodiment, the disclosed application may automatically invite all members with 100% matching flight parameters to book the shared flight itinerary.

FIGS. 5A and 5B show a preferred embodiment of a booking interface 500 that allows members to manage their booking invitation. In this particular example, booking interface 500 displays all members that have been invited to book a particular shared flight itinerary. In this example, booking interface 500 shows some basic flight parameters of the shared itinerary, such as departure location 501, destination location 502, departure date 503, departure time 504, the passenger total 505, the total flight cost 506, Member A 507 and Member B 508 and their respective flight cost share 509 and their respective booking status 510. In the preferred embodiment, each member can choose from a menu of prepared status messages available in status message menu 511, such as, for example, "Yes, ready to book", or "No, not ready to book" or similar status messages. After every status update a member must select update 512, causing the disclosed negotiation software application to update its associated database.

Once a member indicated the willingness to book the flight, the member will be prompted to enter payment information, such as, for example, the member's credit card information. An example of a billing interface 513 is shown in FIG. 5B.

In order for the shared flight itinerary to become a booked flight, all invited members must expressly agree to book the shared flight itinerary. If any one of the users does not agree to book the shared flight itinerary, the invitation to book this particular shared flight itinerary expires or closes and no flight itinerary is booked.

FIG. 5C shows an example of a booking status interface 520 where a member has confirmed the willingness to book the shared flight itinerary and has provided the required payment information. In this example, not all members participating in the shared flight itinerary have confirmed the willingness to book the shared itinerary and therefore the status of the invitation is indicated as "Open." Once all members have accepted the invitation to book the shared flight itinerary, the members will be charged their share of the cost using the member's submitted payment information. At this point the proposed shared itinerary becomes a scheduled itinerary. Once a shared itinerary has been booked, i.e., scheduled, it will no longer be available to other users of the disclosed software application. The booked itinerary will only be accessible to the members who negotiated the particular shared flight itinerary, but will not be included in search results of other searching members.

Finally, (not shown) the disclosed application forwards the details of the shared flight itinerary to the associated air charter brokerage service, where the flight parameters of the shared flight itinerary are used to charter an aircraft to fulfill the shared itinerary.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for allowing searching travelers and proposing travelers to directly negotiate a shared flight itinerary for on-demand charter aircraft service over the Internet, the method comprising the steps of:

permitting access to a web-based shared flight itinerary computer software application to proposing travelers and searching travelers, the software application being executed by a processor on one or more computers;

displaying a user interface to a proposing traveler and receiving a proposed flight itinerary to be directly negotiated and shared with one or more searching travelers, the proposed flight itinerary having associated therewith a plurality of proposed flight parameters, wherein one of the plurality of proposed flight parameters is the proposed departure time of day, and wherein the software application does not enable the proposing traveler to enter the proposed departure time of day as an exact numerical value;

associating, by the processor, the proposed flight itinerary with the proposing traveler who proposed the flight itinerary;

uniquely identifying, by the processor, the proposed flight itinerary and associated plurality of proposed flight parameters in a computer searchable database associated with the software application, the database storing a plurality of proposed flight itineraries, each having associated proposed flight parameters;

receiving, by the processor, at least one of a plurality of search parameters and searching the database for proposed flight itineraries having associated flight parameters that match at least some of the search parameters;

displaying to the searching traveler all proposed flight itineraries having at least some matching proposed flight parameters;

receiving, by the processor, one or more inputs from the searching traveler selecting one or more of the displayed matching proposed flight itineraries in order to enter into a direct negotiation with one or more of the proposing travelers who have proposed the displayed matching flight itineraries; and whereby the software application requires the searching traveler to enter a numerical value for a specific desired departure time of day in order to initiate the negotiation for a shared flight itinerary with the one or more proposing travelers;

receiving, by the processor, one or more inputs from the searching traveler and the one or more proposing travelers directed at the negotiation of one or more of the plurality of proposed flight parameters of the proposed flight itinerary directly between the searching traveler and the one or more proposing travelers; and receiving, by the processor, one or more inputs indicating an agreement between the searching traveler and the one or more proposing travelers with respect to every one of the plurality of proposed flight parameters causing the negotiated proposed flight itinerary to become a common shared flight itinerary, whereby the common shared flight itinerary is negotiated between the searching traveler and the one or more proposing travelers prior to submitting the common shared flight itinerary to an air charter brokerage service for subsequent booking and scheduling of a charter aircraft service corresponding to the common shared flight itinerary.

2. The method of claim 1 wherein the plurality of flight parameters proposed by the proposing traveler includes at least a departure location, a destination location, a departure date and a departure time of day, wherein the departure time of day is described as a part of the day.

3. The method of claim 2 wherein the plurality of flight parameters proposed by the proposing traveler further includes one or more of the following flight parameters:
   a) the number of seats required by the proposing traveler;
   b) the number of seats available to be shared;
   c) whether children will be on the flight;
   d) whether children are welcome on the flight;
   e) whether pets will be on the flight;
   f) whether pets are welcome on the flight;
   g) whether the flight is primarily for business; and
   h) whether the flight is primarily for leisure.

4. The method of claim 1 wherein the step of displaying proposed flight itineraries having at least some matching flight parameters includes displaying information indicative of how many of the proposed flight parameters are an exact match to the searching traveler's search parameters.

5. The method of claim 1 further including the step of receiving, by the processor, an input from the proposing traveler indicating how long the proposed flight itinerary shall be searchable in the database.

6. The method of claim 1 further including the step of receiving, by the processor, an input from the proposing traveler inviting another traveler to negotiate the proposed flight itinerary.

7. The method of claim 1 further including the step of receiving, by the processor, an input from any traveler inviting other travelers to book a shared flight itinerary together.

8. The method of claim 1 further including the step of calculating, by the processor, in response to one or more inputs received from one or more negotiating travelers, the cost of the proposed flight itinerary based on the associated flight parameters at the time the costs are calculated.

9. The method of claim 1 further comprising the step of transmitting, by the processor, the flight parameters of the common shared flight itinerary to an air charter brokerage service for booking and scheduling charter aircraft service for the common shared flight itinerary.

10. The method of claim 9 further including the step of calculating, by the processor, in response to one or more inputs received from one or more negotiating travelers, the cost of the proposed flight itinerary based on the associated flight parameters at the time the costs are calculated.

11. The method of claim 9 further including the step of receiving, by the processor, one or more inputs from the searching travelers and the proposing travelers to invite other travelers with identical proposed flight parameters to book and schedule charter aircraft service for the common shared flight itinerary.

12. The method of claim 9 further including the step of automatically inviting, by the processor, travelers with identical proposed flight parameters to book and schedule charter aircraft service for the common shared flight itinerary.

13. A computer-based system for negotiating shared flight itineraries for on-demand charter aircraft service, the system comprising:
   a first computer, having a first processor, executing at least a part of a software application for negotiating shared flight itineraries;
   a data storage device coupled to the first computer, comprising a computer searchable database;
   a second computer, having a second processor, a display and an input device, and capable of accessing the first computer via the Internet and further capable of executing at least a part of the software application, the first and second computer configured to:
   a) receive one or more proposed flight itineraries from proposing travelers to be directly negotiated and shared with searching travelers, each of the proposed flight itineraries having associated a plurality of proposed flight parameters, wherein one of the plurality of proposed flight parameters is the proposed departure time of day, and wherein the software application does not enable a proposing traveler to enter the proposed departure time of day as an exact numerical value;
   b) associate, by the first processor, the proposed flight itinerary with the proposing traveler who proposed the flight itinerary;
   c) uniquely identify and store, by the first processor, the proposed flight itinerary and associated plurality of proposed flight parameters in the computer searchable database;
   d) receive at least one of a plurality of search parameters from searching travelers, whereby the first processor searches the database for proposed flight itineraries having associated flight parameters that match at least some of the search parameters;
   e) display matching proposed flight itineraries;
   f) receive one or more inputs from the searching traveler selecting one or more of the displayed matching proposed flight itineraries to directly negotiate a common shared flight itinerary with the one or more proposing travelers who have proposed the displayed matching flight itineraries, whereby the software application requires that the searching traveler must enter at least a numerical value for a specific desired departure time of day in order to initiate the negotiation with the one or more proposing travelers;
   g) receive one or more inputs from the searching traveler and the one or more proposing travelers directed at the negotiation of one or more of the plurality of proposed flight parameters of the proposed flight itinerary directly between the searching traveler and the one or more proposing travelers; and
   h) receive one or more inputs indicating an agreement between the searching traveler and the one or more proposing travelers with respect to every one of the plurality of proposed flight parameters causing the negotiated proposed flight itinerary to become a common shared flight itinerary, whereby the common shared flight itinerary is negotiated between the searching traveler and the one or more proposing travelers prior to submitting the common shared flight itinerary to an air charter brokerage service for subsequent booking and scheduling of a charter aircraft service corresponding to the common shared flight itinerary.

14. The system of claim 13 wherein the plurality of flight parameters proposed by the proposing traveler includes at least a departure location, a destination location, a departure date and a departure time of day, wherein the departure time of day is described as a part of the day.

15. The system of claim 13 wherein the plurality of flight parameters proposed by the proposing traveler further includes one or more of the following flight parameters:
   a) the number of seats required by the proposing traveler;
   b) the number of seats available to be shared;
   c) whether children will be on the flight;
   d) whether children are welcome on the flight;
   e) whether pets will be on the flight;
   f) whether pets are welcome on the flight;
   g) whether the flight is primarily for business; and
   h) whether the flight is primarily for leisure.

16. The system of claim 13 wherein the first and second computer are further configured to receive input from the travelers to directly book and schedule charter aircraft service for the common shared flight itinerary.

\* \* \* \* \*